United States Patent
Sistla et al.

(10) Patent No.: US 10,031,848 B2
(45) Date of Patent: Jul. 24, 2018

(54) METHOD AND APPARATUS FOR IMPROVING SNOOPING PERFORMANCE IN A MULTI-CORE MULTI-PROCESSOR

(75) Inventors: Krishnakanth V. Sistla, Hillsboro, OR (US); Yen-Cheng Liu, Portland, OR (US); Zhong-Ning Cai, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 602 days.

(21) Appl. No.: 11/153,031

(22) Filed: Jun. 14, 2005

(65) Prior Publication Data
US 2006/0282622 A1    Dec. 14, 2006

(51) Int. Cl.
G06F 12/08   (2016.01)
G06F 12/084   (2016.01)
G06F 12/0811   (2016.01)
G06F 12/0831   (2016.01)

(52) U.S. Cl.
CPC ........ *G06F 12/084* (2013.01); *G06F 12/0811* (2013.01); *G06F 12/0831* (2013.01)

(58) Field of Classification Search
CPC ........... G06F 12/0831; G06F 2212/621; G06F 12/0811; G06F 12/0815; G06F 12/084; G06F 2212/283; G06F 12/0813; G06F 13/4022; G06F 12/0835; G06F 13/287; G06F 12/0833; G06F 12/0828; G06F 12/0842; G06F 12/1081; G06F 13/1626

USPC ....... 711/118, 120, 128, 133, 135, 141, 143, 711/146, 147
See application file for complete search history.

(56) References Cited

U.S. PATENT DOCUMENTS

| | | | | |
|---|---|---|---|---|
| 5,432,918 A * | 7/1995 | Stamm | .................. | G06F 9/3836 710/112 |
| 5,684,977 A * | 11/1997 | Van Loo | .............. | G06F 12/0822 711/120 |
| 6,145,062 A * | 11/2000 | Chittor et al. | ................ | 711/154 |
| 6,301,627 B1 * | 10/2001 | Neal et al. | ...................... | 710/40 |
| 6,668,309 B2 * | 12/2003 | Bachand | ............ | G06F 12/0831 711/140 |
| 6,810,470 B1 * | 10/2004 | Wiseman et al. | ............. | 711/163 |
| 7,167,957 B2 * | 1/2007 | Khare et al. | ................ | 711/151 |
| 7,177,987 B2 * | 2/2007 | Van Doren | ......... | G06F 12/0828 711/119 |
| 2006/0053257 A1 * | 3/2006 | Sistla et al. | .................. | 711/143 |

* cited by examiner

*Primary Examiner* — Zhuo Li
(74) *Attorney, Agent, or Firm* — Nicholson De Vos Webster & Elliott LLP

(57) ABSTRACT

A method and apparatus for improving snooping performance is disclosed. In one embodiment, one or more content addressable matches are used to determine where and when an address conflict occurs. Depending upon the timing, a read request or a snoop request may be set for retry. In another embodiment, an age order matrix may be used to determine when several core snoop requests may be issued during a same time period, so that the snoops may be processed during this time period.

12 Claims, 11 Drawing Sheets

| STATE | L2PND | L2OWN | L2OWN | L2OWN | L2OWN | L2OWN | CSDETECT | CSPND | CSPND |
|---|---|---|---|---|---|---|---|---|---|
| ACTION | L2 REQUEST | | READ-WB CAM | TAG CANCEL CLOCK | | | CSNP-WB CAM | | WB-CSNP CAM |
| | $T_0$ | $T_1$ | $T_2$ | $T_3$ | $T_4$ | $T_5$ | $T_6$ | $T_7$ | $T_8$ |

Cache Grant → (at $T_1$)
Tag Update Clock → (at $T_4$)
Csnp Issued to interface → (at $T_7$)

FIG. 5

FIRST CONFLICT WINDOW

SECOND CONFLICT WINDOW

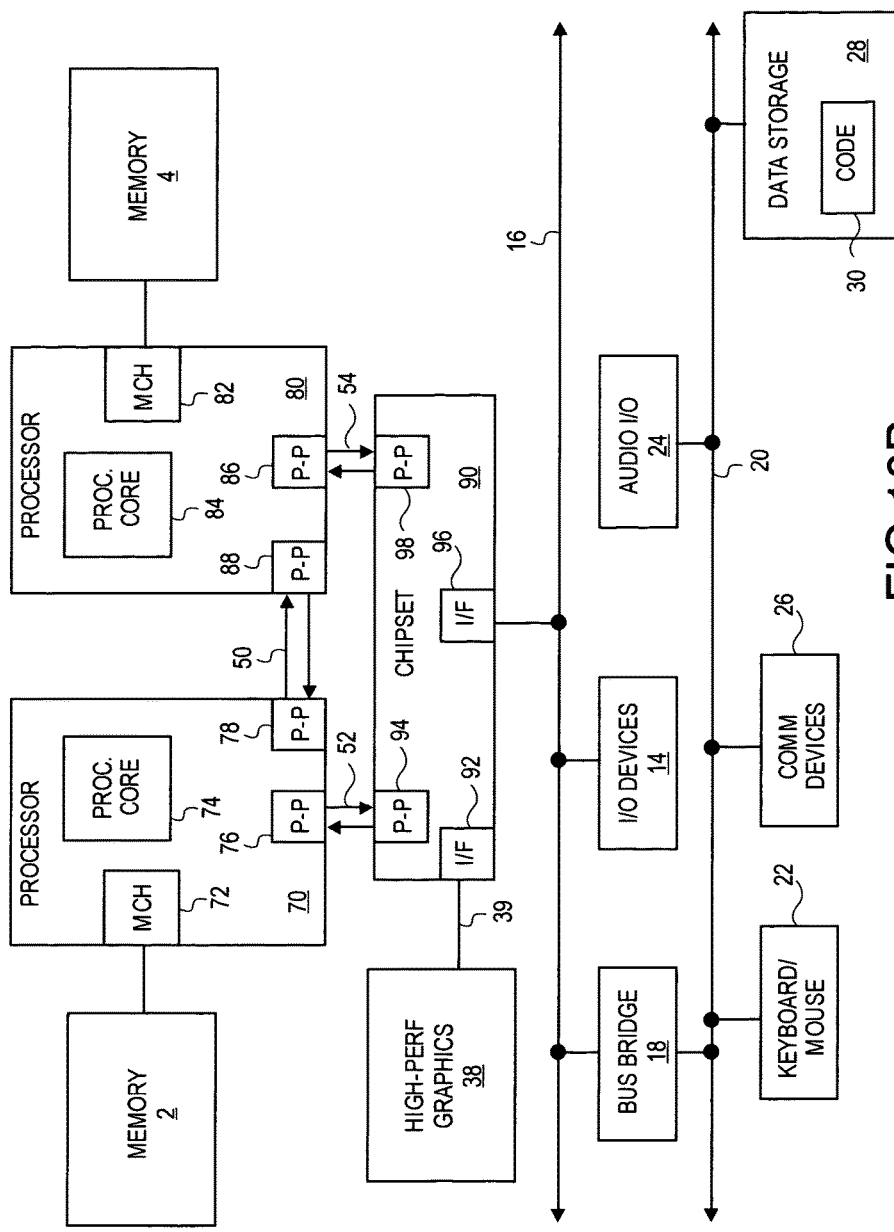

METHOD AND APPARATUS FOR IMPROVING SNOOPING PERFORMANCE IN A MULTI-CORE MULTI-PROCESSOR

FIELD

The present disclosure relates generally to microprocessors that snoop memory transactions to preserve cache coherency, and more specifically to multi-core microprocessors that use a caching bridge to separate cores from a system interconnect interface.

BACKGROUND

Multi-core processors may contain multiple processor cores which are connected to an on-die shared cache though a shared cache scheduler and coherence controller. Multi-core multi-processor systems are becoming increasingly popular in commercial server systems because of their improved scalability and modular design. The coherence controller and the shared cache can either be centralized or distributed among the cores depending on the number of cores in the processor design. The shared cache is often designed as an inclusive cache to provide good snoop filtering. Cross-snoop transactions may be used to provide efficient sharing of the on-die cache between multiple cores. However, writeback transactions from the core caches need to update the shared cache to maintain its inclusive nature. These in-flight core writebacks and cross-snoop transactions can conflict with each other in multiple time windows.

In addition to recovery from writeback and cross-snoop transaction conflicts, within a multi-core processor a caching bridge may be used. The caching bridge may be the scheduling logic that handles all incoming and outgoing transactions from the cores and the system interconnect. Incoming snoop transactions may arrive at this package on the system interconnect. There a queue structure that handles all incoming snoop transactions, called a snoop queue, may be used. Snoop transactions are expected to be frequent in server applications as more threads are sharing the same address space. For this reason, any improved use of the snoop path may result in an overall system performance increase.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5 is a pipeline diagram of a scheduler, according to one embodiment.

FIGS. 10A and 10B are schematic diagrams of systems including processors with slice data buffers, according to two embodiments of the present disclosure.

DETAILED DESCRIPTION

The following description describes techniques for improved handling of cache-coherency snoops in a multi-core processor. In the following description, numerous specific details such as logic implementations, software module allocation, bus and other interface signaling techniques, and details of operation are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation. In certain embodiments the invention is disclosed in the form caching bridges present in implementations of multi-core Pentium® compatible processor such as those produced by Intel® Corporation. However, the invention may be practiced in the cache-coherency schemes present in other kinds of multi-core processors, such as an Itanium® Processor Family compatible processor or an X-Scale® family compatible processor.

Figure 1:
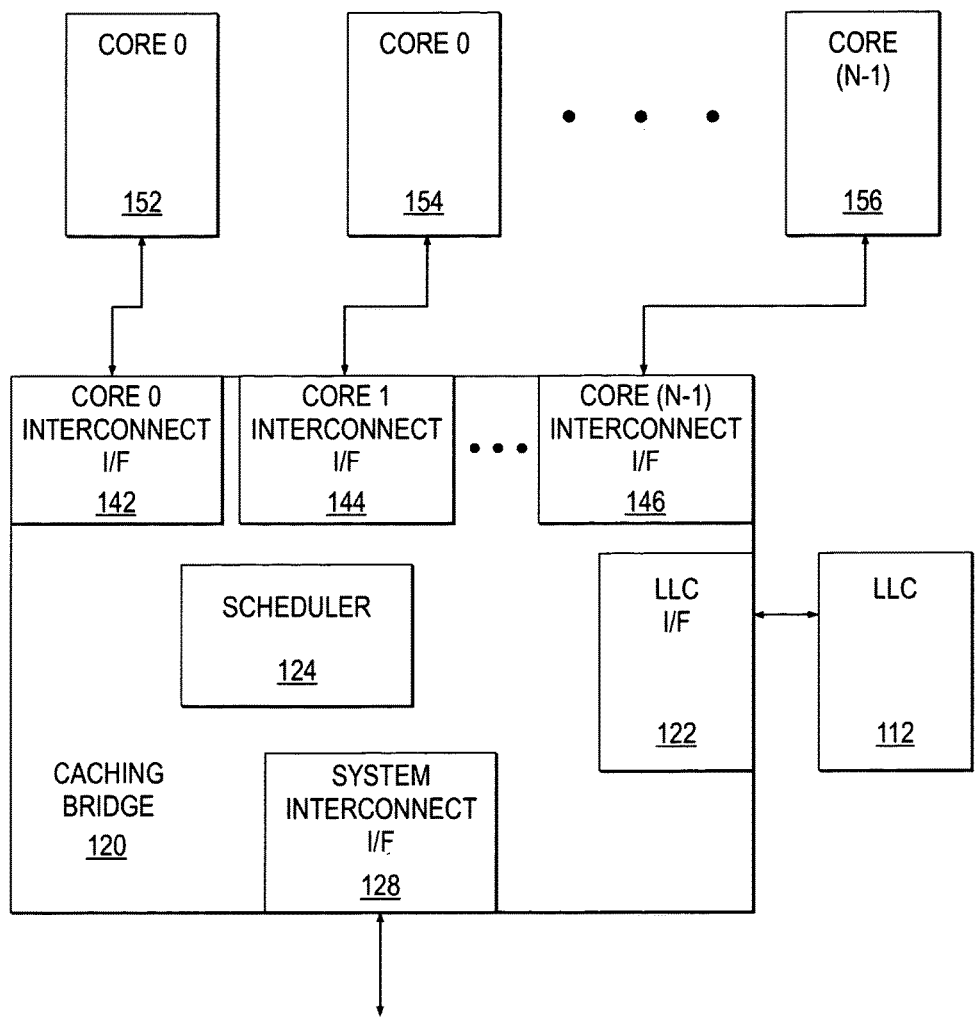
FIG. 1 is a schematic diagram of a processor including a bridge and multiple cores, according to one embodiment.

Referring now to FIG. 1, a schematic diagram of a processor 110 including a bridge and multiple cores is shown, according to one embodiment. Processor 110 may have N processor cores, with core 0 152, core 1 154, and core (N−1) 156 shown. Here N may be any number. Each core may be connected to a bridge as shown using interconnections, with core 0 interconnect interface 142, core 1 interconnect interface 144, and core (N−1) interconnect interface 146 shown. In one embodiment, each core interconnect interface may be a standard front-side bus (FSB) with only two agents, the bridge and the respective core, implemented. In other embodiments, other forms of interconnect interface could be used such as dedicated point-to-point interfaces.

Caching bridge 120 may connect with the processor cores as discussed above, but may also connect with system components external to processor 110 via a system interconnect interface 128. In one embodiment the system interconnect interface 128 may be a FSB. However, in other embodiments system interconnect interface 128 may be a dedicated point-to-point interface.

Processor 110 may in one embodiment include an on-die shared cache. This cache may be a last-level cache (LLC) 112, which is named for the situation in which the LLC is the cache in processor 110 that is closest to system memory (not shown) accessed via system interconnect interface 128. In other embodiments, the cache shown attached to a bridge may be of another order in a cache-coherency scheme.

Scheduler 124 may be responsible for the cache-coherency of LLC 112. When one of the cores, such as core 0 152, requests a particular cache line, it may issue a core request up to the scheduler 124 of bridge 120. The scheduler 124 may then issue a cross-snoop when needed to one or more of the other cores, such as core 1 154. In some embodiments the cross-snoops may have to be issued to all other cores. In some embodiments, that may implement portions of a directory-based coherency scheme (e.g. core bits), the scheduler 124 may know which of the cores have a particular cache line in their caches. In these cases the scheduler 124 may need only send a cross-snoop to the indicated core or cores.

Figure 2:
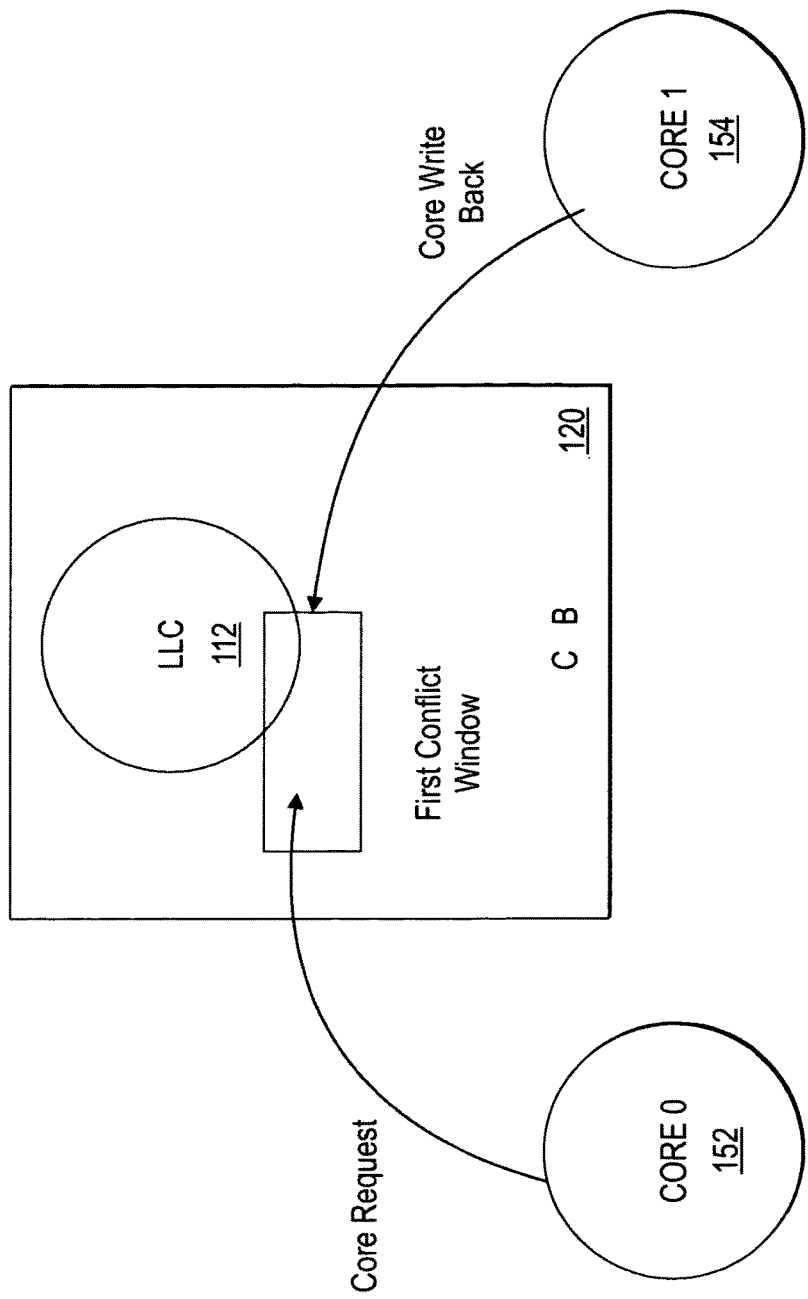
FIG. 2 is a diagram of a first conflict window between a core request and a writeback, according to one embodiment.

Referring now to FIG. 2, a diagram of a first conflict window between a core request and a writeback is shown, according to one embodiment. It is noteworthy that any writebacks (of a particular cache line) in flight indicate that the core initiating the writeback has exclusive ownership of that corresponding cache line. In cases where portions of a directory-based coherency scheme have been implemented, only one entry in the directory structure (e.g. only one core bit) would indicate this.

In FIG. 2 the writeback from core 1 154 has occurred slightly before the core request from core 0 153. The writeback thus is allocated into the cache-control logic of the scheduler before the core request completes its look-up in the scheduler. The result of this is that the writeback will beat the core request in getting its access to the LLC. The writeback is part of the cache line of interest being evicted from the cache in core 1 154, and so therefore it no longer exists in core 1 154 when the core request arrives in the scheduler. It is important to note that the writeback is for this reason "unstoppable" in that it may not be delayed because its modified cache line is no longer resident in core 1 154.

Figure 3:
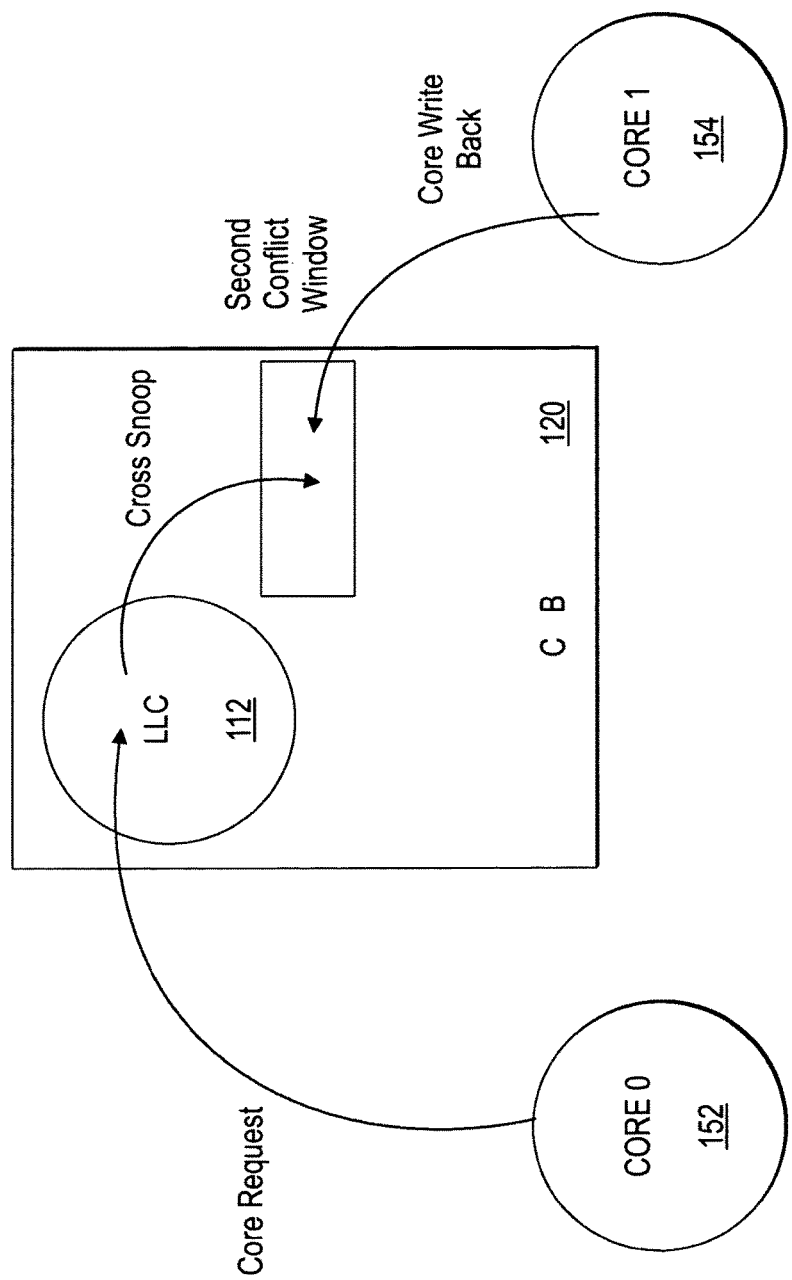
FIG. 3 is a diagram of a second conflict window between a cross-snoop request and a writeback, according to one embodiment.

Referring now to FIG. 3, a diagram of a second conflict window between a cross-snoop request and a writeback is shown, according to one embodiment. In this example the writeback from core 1 154 has occurred slightly after the core request from core 0 153. Since the core request has arrived in the scheduler first, it is in the process of process of generating a cross-snoop, and it is possible that the cross-snoop has caused some modification of the shared cache coherency state of the cache line of interest. Any conflict resolution adopted may need to account for this modified state.

It is also noteworthy that the conflict window here is bounded by the time the cross-snoop is observed by core 1 154. If this happens before the writeback leaves core 1 154, the writeback in this circumstance may be cancelled, and core 1 154 may issue a hit-modified "HitM" signal.

Figure 4:
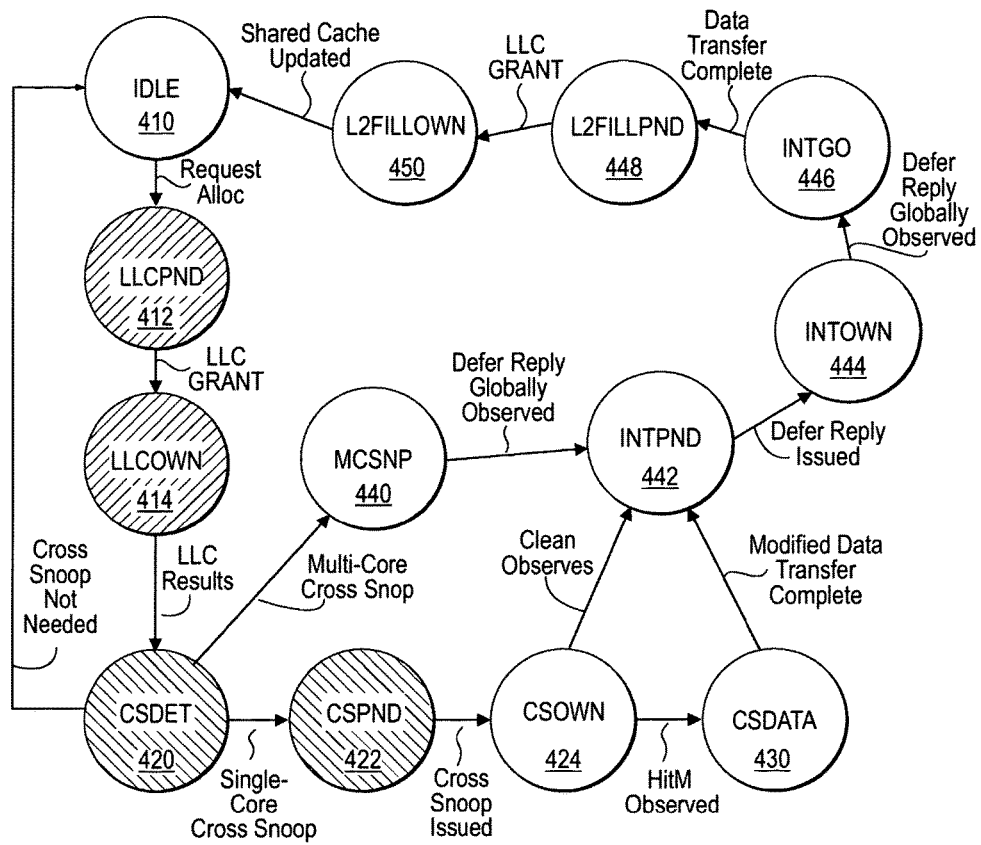
FIG. 4 is a logic state diagram of a conventional cross-snoops processing state machine, according to one embodiment.

Referring now to FIG. 4, a logic state diagram of a conventional cross-snoops processing state machine is shown, according to one embodiment. In each case the state begins at IDLE 410. When core 0 issues a core request, the state advances to LLC pending (LLCPND) 412 as the scheduler receives the request, and, upon beginning to search for the cache line, to LLC owns (LLCOWN) 414. In these states, the core request arrives in the scheduler and the scheduler performs the corresponding look-up in the LLC. If a writeback to the corresponding cache line had arrived earlier than the events shown in LLCPND 412 and LLCOWN 414, this would generally correspond to the situation described in FIG. 2 above.

After the scheduler performs the look-up in LLCOWN 414, it determines whether it should perform a cross-snoop to the other cores in cross-snoop detect CSDETECT 420. Factors that enter into this determination may include the fact that the cache-coherency scheme is inclusive, and that the scheduler may include all or portions of a directory-based coherency scheme (e.g. core bits that indicate which cores may contain a particular cache line). If the scheduler determines that no cross-snoops are necessary, it may return the cache line and return to IDLE 410. If the scheduler determines that a single core may include the cache line, it may proceed to cross-snoop pending CSPND 422, from whence a single cross-snoop may be issued. If the scheduler determines that multiple cores may include the cache line, it may proceed to perform a multi-core cross-snoop MCSNP 440, from whence multiple cross-snoops may be issued.

In states CSDETECT 420 and SCSPND 422, the need for a cross-snoop is determined and the scheduler proceeds to issue the single core cross-snoop. If a writeback to the corresponding cache line had arrived earlier than the events shown in states CSDETECT 420 and SCSPND 422, this would generally correspond to the situation described in FIG. 3 above. It is noteworthy that there would be no conflicts with writebacks if the states of the scheduler progressed from CSDETECT 420 through MCSNP 440, since these would indicate a state other than exclusive in a core, and therefore there would be no modified states present to cause a writeback.

Referring now to FIG. 5, a pipeline diagram of a scheduler is shown, according to one embodiment. In one embodiment, this may be the scheduler of FIG. 1. States are given along the top row, while actions related thereto are given along the bottom row.

In order to make the determination whether a conflict exists between a core request and a writeback, or between a cross-snoop and a writeback, in one embodiment a content-addressable match (CAM) logic may be used. In one embodiment the CAM logic may be a simplified version of a content-addressable memory, which only needs to output an indication that a match has been found, not the data itself. The CAM logic may take the physical address of the current memory transaction, and compare it to the addresses of all of the present entries in the outgoing transaction queue. If a match is found, the CAM logic may be said to have observed a "hit".

In the FIG. 5 embodiment, three CAM logics are shown for the purpose of conflict detection. In other embodiments, more or fewer than three CAM logics may be used. A read-core-request-writeback CAM (read-wb CAM), a cross-snoop-writeback CAM (csnp-wb CAM), and writeback-cross-snoop (wb-csnp CAM) are shown in three places within the scheduler pipeline.

The read-wb CAM may indicate a "hit" when a core request has an address match with a writeback during the clock period of the scheduler pipeline where the read-wb CAM operation is performed. In the FIG. 5 embodiment, this clock period is shown as the T2 clock period, although in other embodiments other clock periods could be used. In the case where the cache-coherency scheme is inclusive, and depending upon the implementation of the inclusive cache, there may be a clock before which no updates to cache tags may have happened for the present read core request. This may be the first opportunity to prevent any changes to a cache tag if a conflict is detected.

The read-wb CAM is shown placed two clock periods before the tag update clock. In other embodiments, other amounts of clock periods could be used. The read-wb CAM may therefore detect conflicts where the writeback arrives two clock periods before the tag update clock. If the read-wb CAM has a hit, then a cancel signal may be sent from the read-wb CAM to the shared cache tag, preventing any updates to the cache tag. Additionally, if a hit is found, the read-wb CAM may also set a retried bit for the core request. This may cause the core request to be tried again later. In other embodiments, other means of deferring the core request may be used.

The csnp-wb CAM may indicate a "hit" when a cross-snoop has an address match with a writeback during the clock period of the scheduler pipeline where the csnp-wb CAM operation is performed. In the FIG. 5 embodiment, this clock period is shown as the T6 clock period, although in other embodiments other clock periods could be used. The csnp-wb CAM may be placed subsequent to the core request's lookup in the shared LLC being completed. In the state diagram of FIG. 4, this may correspond to the CSDETECT 420 state. The csnp-wb CAM may detect cases where the writeback which causes the conflict may arrive between the time period of the read-wb CAM and the entry into the CSDETECT 420 state. This may generally be considered the end of the conflict window shown in FIG. 2 above. A hit to the csnp-wb CAM may set a retried bit for the cross-snoop. This may cause the cross-snoop to be tried again later. In other embodiments, other means of deferring the cross-snoop may be used. The hit to the csnp-wb CAM may also prevent the state from progressing into the CSPND 422 state.

The wb-csnp CAM may indicate a "hit" when a writeback has an address match with a cross-snoop during the clock period of the scheduler pipeline where the wb-csnp CAM operation is performed. In the FIG. 5 embodiment, this clock period is shown as the T8 clock period, although in other embodiments other clock periods could be used. During the time period of operation of the wb-csnp CAM, the state machine of the scheduler may be in the process of issuing the cross-snoop transaction. In the state diagram of FIG. 4, this may correspond to the CSPND 422 state. The wb-csnp CAM may detect cases where the writeback which causes the conflict may arrive during CSPND 422 and before the entry into the CSOWN 424 state. This may generally be considered the conflict window shown in FIG. 3 above. A hit to the wb-csnp CAM may set a retried bit for the cross-snoop. This may cause the cross-snoop to be tried again later. In other embodiments, other means of deferring the cross-snoop may be used. It is noteworthy that such a conflict would not happen once the cross-snoop enters the CSOWN 424 state. This is because once the cross-snoop is observed by the core, the pending writeback will not be issued by the core.

Figure 6:
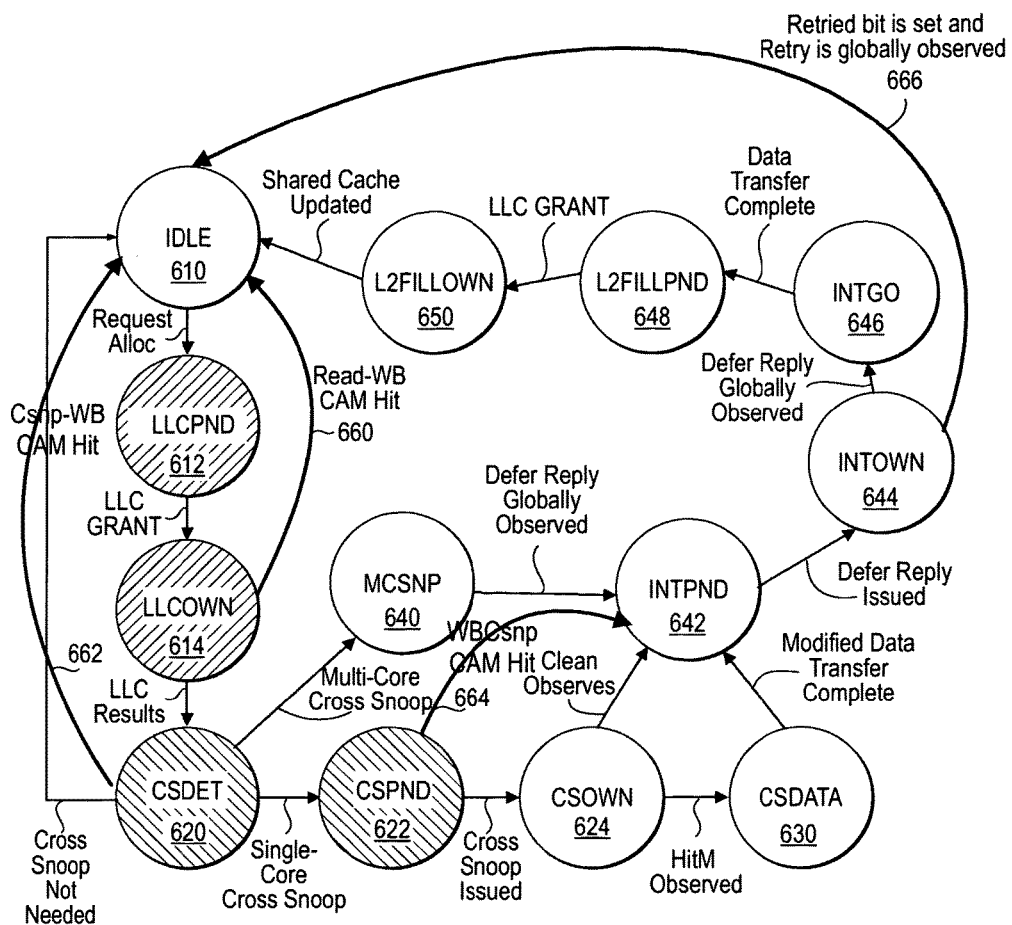
FIG. 6 is a logic state diagram of the pipeline of FIG. 5, according to one embodiment.
Figure 6:
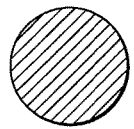
Figure 6:
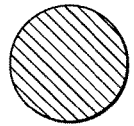

Referring now to FIG. 6, a logic state diagram of the pipeline of FIG. 5 is shown, according to one embodiment. In the FIG. 6 embodiment, many of the states may generally correspond to those shown in FIG. 4 above, but may have additional conflict resolution paths 660, 662, 664, and 666 added to modified scheduler states. The modifications may take into account any CAM hits found.

Whenever a hit is found in the read-wb CAM, the following actions may be taken. A cancel signal may be sent from the read-wb CAM to the shared cache tag, preventing any updates to the cache tag. The scheduler may indicate a retry response to the requesting core, which may include setting a retried bit. In this case the writeback is allowed to proceed, and the process via conflict resolution path 660 returns to the IDLE 610 state.

Whenever a hit is found in the csnp-wb CAM, the following actions may be taken. The state machine may be inhibited from advancing from CSDETECT 620 to CSPND 622. This may mean that the cross-snoop may not be issued to the cores, and that the cross-snoop may be marked for retry. It is noteworthy that the core request may have already modified the shared LLC cache during the LLCOWN 614 state. In one embodiment, the writeback is allowed to proceed, and will then at some future time update the shared LLC cache. The process would then via conflict resolution path 662 return to the IDLE 610 state.

In another embodiment, called an "atomic cross-snoop" embodiment, the writeback may be converted into a back-snoop instead of proceeding in a traditional manner. In this case the state of the tag of the writeback has been updated to "invalid" during the LLCOWN 614 state. The conversion into a back-snoop may help ensure that the modified data is written back to the system memory. More details on an atomic cross-snoop cache implementation may be found in "Resolving Cache Conflicts", U.S. patent application Ser. No. 10/937,973, filed on 9 Sep. 2004, which is hereby incorporated by reference.

Whenever a hit is found in the wb-csnp CAM, the following actions may be taken. The state machine may be inhibited from advancing from CSPND 622 to CSOWN 624. This may mean that the original cache look-up may have issued a "defer" response to the requesting core in states INTPKD 642 and INTOWN 644, which are entered via conflict resolution path 664. Since a defer response has already been indicated, a defer reply should be sent. In this case, the cache logic may send a defer reply with a "retry" response in state INTOWN 644. There may be no data transferred in this case, since the cross-snoop has been retried. For this reason, on completing signaling the snoop response, the cross-snoop transaction may transition along conflict resolution path 666 to the IDLE 610 state. As with the case of the csnp-wb CAM observing a hit, in one embodiment the writeback is allowed to proceed, and will then at some future time update the shared LLC cache.

In another embodiment, again called an "atomic cross-snoop" embodiment, the writeback may be converted into a back-snoop instead of proceeding in a traditional manner. In this case the state of the tag of the writeback has been updated to "invalid" during the LLCOWN 614 state. The conversion into a back-snoop may again help ensure that the modified data is written back to the system memory.

Figure 7:
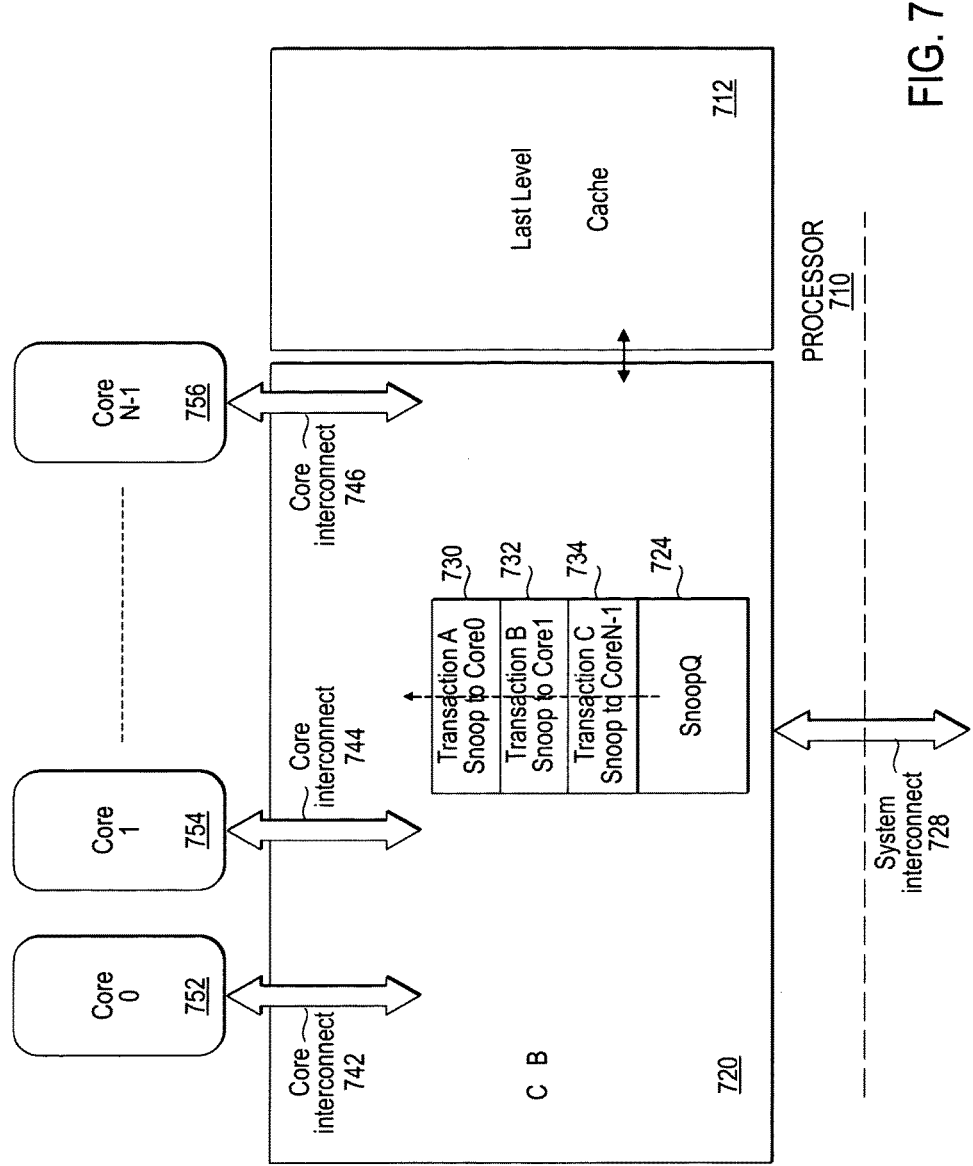
FIG. 7 is a schematic diagram of snoops entering the cores, according to one embodiment.

Referring now to FIG. 7, a schematic diagram of snoops entering the cores is shown, according to one embodiment. In the FIG. 7 example, snoops arrive from outside processor 710 on system interconnect interface 728 and may be held in a snoop-queue 724. The snoops may then be issued on a first-in first-out (FIFO) basis to each individual core.

In a traditional use of snoop-queue 724, transaction A 730, a snoop to core 0, may be issued first. In this embodiment, transaction B 732, a snoop to core 1, may not be issued until the state machine has passed the interconnect own (INTOWN) state, wherein the request has been sent on the core interconnect interface 742 of core 0 752. Each transaction needs to wait until the previous transaction has gone into the INTOWN state. By operating in order using the snoop-queue 724, memory ordering may be preserved, but at the cost of lower system throughput.

Figure 8:
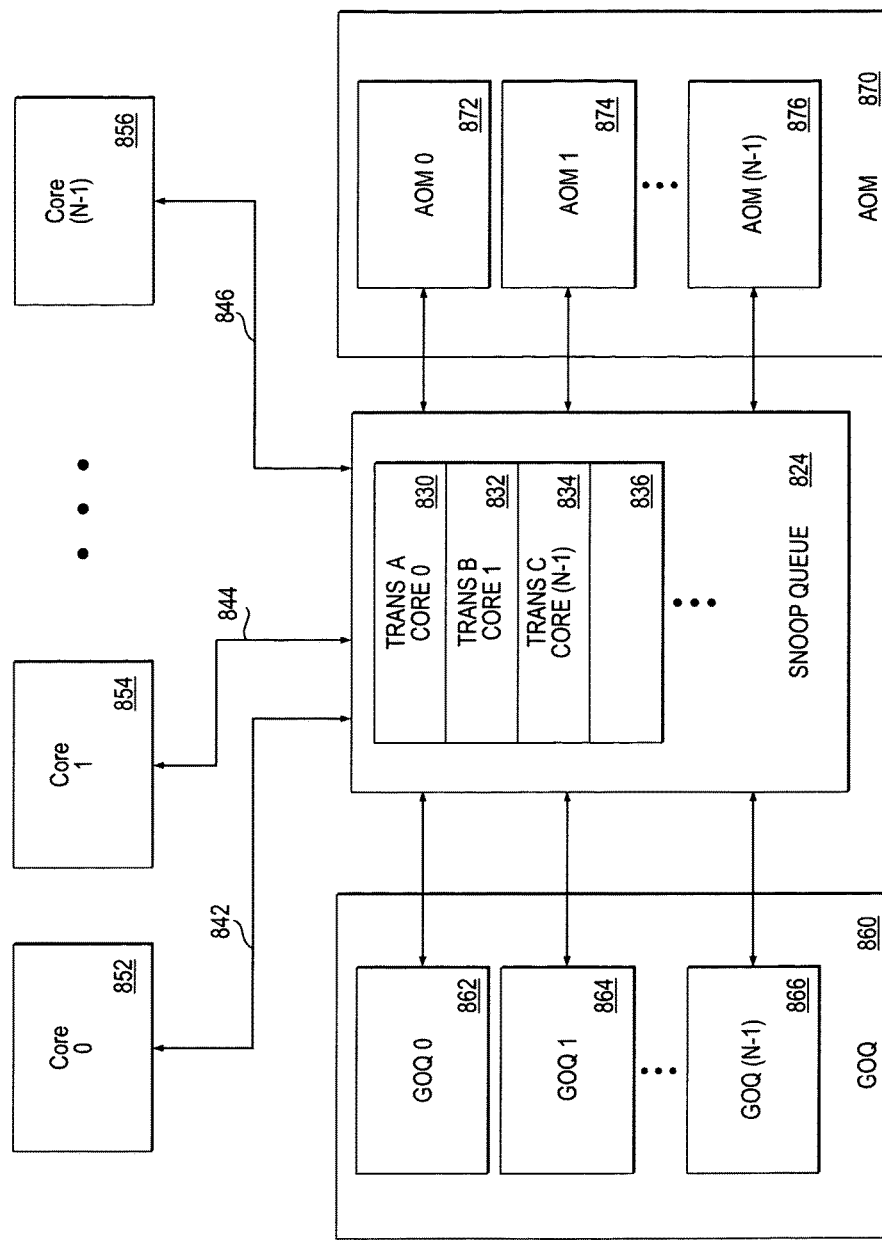
FIG. 8 is a schematic diagram of queues in a scheduler, according to one embodiment of the present disclosure.

Referring now to FIG. 8, a schematic diagram of queues in a scheduler is shown, according to one embodiment of the present disclosure. Here in one embodiment snoop-queue 824 may have associated with it one or more age-order matrices (AOM) 872, 874, 876, each associated with a particular core. For example, AOM 0 872 may contain age-ordering information about snoop requests going to core 0 852, and AOM (N−1) 876 may contain age-ordering information about snoop requests going to core (N−1) 856. Logic within snoop-queue 824 may populate entries within each AOM so that they contain relative age-ordering information about the snoop requests presently contained within snoop-queue 824, on a relevant per-core basis.

In one embodiment, snoop-queue 824 may additionally have associated with it one or more global-ordering queues (GOQ) 862, 864, 866, each also associated with a particular core. For example, GOQ may contain global-ordering information about snoop requests going to core 0 852, and GOQ (N−1) 866 may contain global-ordering information about snoop requests going to core (N−1) 856. In this example, global-ordering refers to the order in which the snoop request transactions appear on the system interconnect: i.e. the order in which they become globally observable. Logic within snoop-queue 824 may populate entries within each GOQ so that they contain global-ordering information about the snoop request transactions presently contained within snoop-queue 824, on a relevant per-core basis.

In one embodiment, the GOQs may be as described in "Exploring Global Ordering Through a Caching Bridge in a Multicore Multiprocessor System", U.S. patent application Ser. No. 11/026,676, filed on 30 Dec. 2004, which is hereby incorporated by reference. In other embodiments, the GOQs may operate in a different manner as long as they provide global-ordering information. In yet other embodiments, the snoop-queue 824 may operate without the separate GOQs.

Snoop-queue 824 may issue several transactions that will be pending at the same time, when the several transactions may each be to a distinct processor core. This may permit each core to service the snoop during the same time period, which may enhance system performance. In one embodiment, snoop-queue 824 may issue a transaction to a particular core, say core X, upon the consideration of three factors.

The first factor may be that logic of snoop-queue 824 may indicate that a snoop transaction to core X is required. This may be caused by logic of snoop-queue 824 having a directory or part of a directory (e.g. corebits) that indicates that core X specifically has the requested data. In embodiments where logic of snoop-queue has no directory, this factor may be omitted.

The second factor may be when the AOM corresponding to core X, e.g. AOM X, indicates that the current snoop-queue 824 entry is the oldest pending snoop-request transaction going to core X. This may serialize the snoop-request among the snoop-requests issued to core X in order to conform with processor memory global-ordering requirements in processors such as those compatible with the Intel® Pentium® architecture.

The third factor may be when the GOQ corresponding to core X, e.g. GOQ X, indicates that all pending requests, prior to the current snoop-queue 824 entry, for core X have been issued. In embodiments where there are no GOQs, this factor may be omitted.

It is noteworthy that since both the AOMs and the GOQs (where present) are per-core based, they may be implemented physically as a common queue structure, but yet be logically partitioned in a per-core basis in order to support the processing of snoop-requests in multiple cores during the same time period.

When the results of the multiple snoop-requests arrive from the various processor cores, they should be put back in proper order. This may be performed by computing the relative age of entries in the snoop-queue 824 that are in an ex-pending state. The oldest entry among these may be selected to return the snoop results, as well as any corresponding writeback data.

Figure 9:
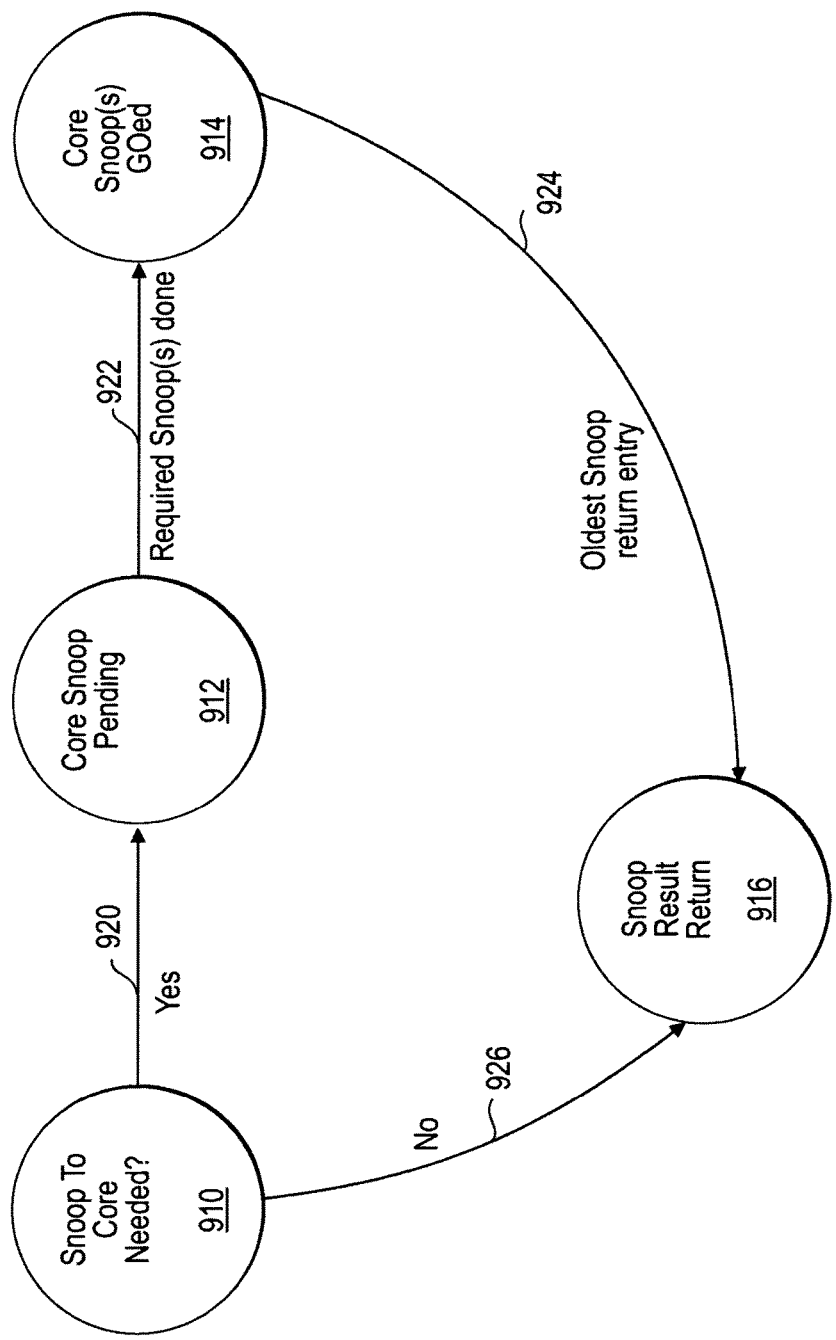
FIG. 9 is a logic state diagram of queues in a scheduler, according to one embodiment of the present disclosure.

Referring now to FIG. 9, a logic state diagram of queues in a scheduler is shown, according to one embodiment of the present disclosure. State 910 may be reached when an external memory request finishes its lookup in the LLC, and determines that some further snooping may be required. In state 910 it may be determined whether a snoop to a particular core, such as core X, is needed. This may be performed by logic of the snoop-queue by examining a directory or partial directory (e.g. corebits). In other embodiments, all cores may need to be snooped.

The determination of whether to issue a snoop request from the snoop-queue may be made by a process that in one embodiment may be summarized by pseudo-code "A" as follows:

---
PSEUDO-CODE A
---
```
For(i = 0 to All cores that require snoops) {
    if ((Oldest entry in GOQ to core i) AND
    (Oldest entry in AOM to core i)) {
        Make snoop request to core i
    }
}
```
---

It is noteworthy that pseudo-code A summarizes one embodiment of issuing snoop requests as discussed above in connection with FIG. 8.

When it is determined that a snoop request may be issued, the state advances to state 912. When the results of the various snoop requests return, a process to collect the snoop results may be used. This process may determine when to issue the snoop results out onto the system interconnect interface, otherwise known as when the snoop results should be "globally observable" or GO. In one embodiment the process may make this determination by remembering which cores require snoops and whether these cores have received a GO indication.

In one embodiment this process may be summarized by pseudo-code "B" as follows:

---
PSEUDO-CODE B
---
```
For (i = 0 to All cores){
    if (((Core i snoop is required) XOR
    (Core i snoop receives GO signal)) = 0) {
        Core snoop is done.
    }
}
If (All core XOR results = 0) Transition to core snoop GOed.
```
---

Briefly, when all the pending core snoops are GOed, the particular snoop request within the snoop-queue waits until it is the oldest before actually sending its snoop results out on the system interconnect. This behavior may preserve the memory ordering requirements.

Figure 10A:
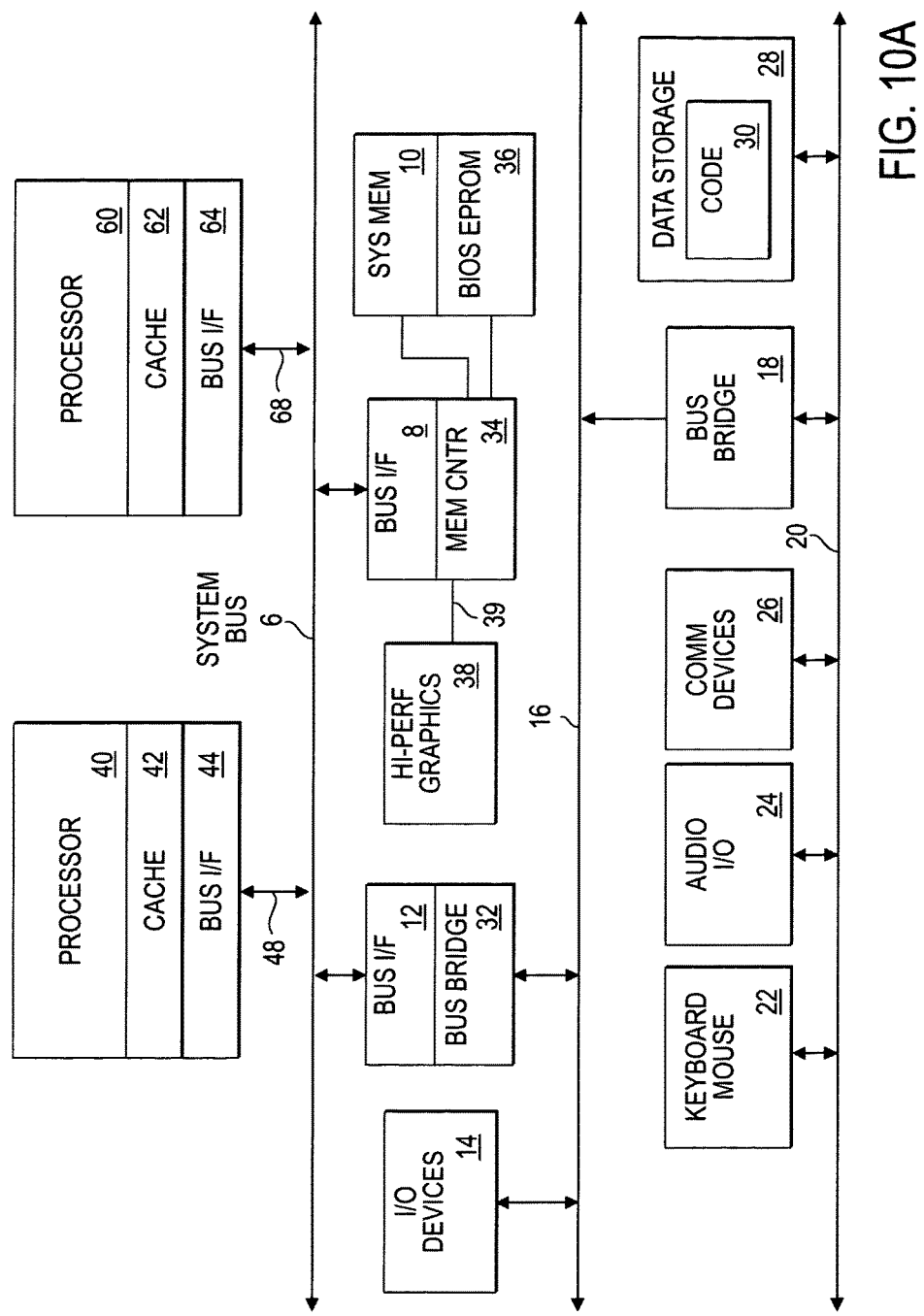

Referring now to FIGS. 10A and 10B, schematic diagrams of systems including processors with multiple cores are shown, according to two embodiments of the present disclosure. The FIG. 10A system generally shows a system where processors, memory, and input/output devices are interconnected by a system bus, whereas the FIG. 10B system generally shows a system where processors, memory, and input/output devices are interconnected by a number of point-to-point interfaces.

The FIG. 10A system may include several processors, of which only two, processors 40, 60 are shown for clarity. Processors 40, 60 may include last-level caches 42, 62. The FIG. 10A system may have several functions connected via bus interfaces 44, 64, 12, 8 with a system bus 6. In one embodiment, system bus 6 may be the front side bus (FSB) utilized with Pentium® class microprocessors manufactured by Intel® Corporation. In other embodiments, other busses may be used. In some embodiments memory controller 34 and bus bridge 32 may collectively be referred to as a chipset. In some embodiments, functions of a chipset may be divided among physical chips differently than as shown in the FIG. 10A embodiment.

Memory controller 34 may permit processors 40, 60 to read and write from system memory 10 and from a basic input/output system (BIOS) erasable programmable read-only memory (EPROM) 36. In some embodiments BIOS EPROM 36 may utilize flash memory. Memory controller 34 may include a bus interface 8 to permit memory read and write data to be carried to and from bus agents on system bus 6. Memory controller 34 may also connect with a high-performance graphics circuit 38 across a high-performance graphics interface 39. In certain embodiments the high-performance graphics interface 39 may be an advanced graphics port AGP interface. Memory controller 34 may direct data from system memory 10 to the high-performance graphics circuit 38 across high-performance graphics interface 39.

The FIG. 10B system may also include several processors, of which only two, processors 70, 80 are shown for clarity. Processors 70, 80 may each include a local memory controller hub (MCH) 72, 82 to connect with memory 2, 4. Processors 70, 80 may also include last-level caches 56, 58. Processors 70, 80 may exchange data via a point-to-point interface 50 using point-to-point interface circuits 78, 88. Processors 70, 80 may each exchange data with a chipset 90 via individual point-to-point interfaces 52, 54 using point to point interface circuits 76, 94, 86, 98. Chipset 90 may also exchange data with a high-performance graphics circuit 38 via a high-performance graphics interface 92.

In the FIG. 10A system, bus bridge 32 may permit data exchanges between system bus 6 and bus 16, which may in some embodiments be a industry standard architecture (ISA) bus or a peripheral component interconnect (PCI) bus. In the FIG. 9B system, chipset 90 may exchange data with a bus 16 via a bus interface 96. In either system, there may be various input/output (I/O) devices 14 on the bus 16, including in some embodiments low performance graphics controllers, video controllers, and networking controllers. Another bus bridge 18 may in some embodiments be used to permit data exchanges between bus 16 and bus 20. Bus 20 may in some embodiments be a small computer system interface (SCSI) bus, an integrated drive electronics (IDE) bus, or a universal serial bus (USB) bus. Additional I/O devices may be connected with bus 20. These may include keyboard and cursor control devices 22, including mice, audio I/O 24, communications devices 26, including modems and network interfaces, and data storage devices 28. Software code 30 may be stored on data storage device 28. In some embodiments, data storage device 28 may be a fixed magnetic disk, a floppy disk drive, an optical disk drive, a magneto-optical disk drive, a magnetic tape, or non-volatile memory including flash memory.

In the foregoing specification, the invention has been described with reference to specific embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A processor, comprising:
    a first core;
    a second core; and
    a scheduler in a bridge to seek an address match from a first memory transaction from a first core to an existing memory transaction from a second core in an outgoing transaction queue, wherein when said first memory transaction is a read request and said existing memory transaction is a writeback, said scheduler cancels a shared tag update when said address match is found.

2. The processor of claim 1, wherein said scheduler identifies said read request for retry when said address match is found.

3. The processor of claim 1, wherein when said first memory transaction is a cross-snoop request and said existing memory transaction is a writeback, said scheduler prevents said cross-snoop request from advancing to a pending state when said address match is found.

4. The processor of claim 1, wherein when said first memory transaction is a cross-snoop request and said existing memory transaction is a writeback, said scheduler identifies said cross-snoop request for retry when said address match is found.

5. The processor of claim 1, wherein when said first memory transaction is a writeback and said existing memory transaction is a cross-snoop request, said scheduler prevents said cross-snoop request from issuing when said address match is found.

6. The processor of claim 1, wherein when said first memory transaction is a writeback and said existing memory transaction is a cross-snoop request, said scheduler identifies said cross-snoop request for retry when said address match is found.

7. A method, comprising:
    seeking an address match between an existing memory transaction from a second core in an outgoing transaction queue of a processor with a first memory transaction from a first core of the processor; and
    identifying a conflict when said address match is found, wherein when said first memory transaction is a read request and said existing memory transaction is a writeback, and wherein said identifying includes marking said read request for a retry to the first core of the processor when said address match is found.

8. The method of claim 7, wherein when said first memory transaction is a cross-snoop request and said existing memory transaction is a writeback, and wherein said identifying includes marking said cross-snoop request for a retry when said address match is found.

9. The method of claim 7, wherein when said first memory transaction is a writeback and said existing memory transaction is a cross-snoop request, and wherein said identifying includes marking said cross-snoop request for a retry when said address match is found.

10. A system, comprising:
    a memory; and
    a processor including a first core, a second core, and a scheduler in a bridge to seek an address match from a first memory transaction from a first core to an existing memory transaction from a second core in an outgoing transaction queue, wherein when said first memory transaction is a read request and said existing memory transaction is a writeback, and wherein said scheduler identifies said read request for retry to the first core of the processor when said address match is found.

11. The system of claim 10, wherein when said first memory transaction is a cross-snoop request and said existing memory transaction is a writeback, and wherein said scheduler identifies said cross-snoop request for retry when said address match is found.

12. The system of claim 10, wherein when the first memory transaction is a writeback and said existing memory transaction is a cross-snoop request, and wherein said scheduler identifies said cross-snoop request for retry when said address match is found.

\* \* \* \* \*